United States Patent [19]
Nash

[11] 3,712,062
[45] Jan. 23, 1973

[54] COOLED AUGMENTOR LINER

[75] Inventor: Dudley O. Nash, Cincinnati, Ohio
[73] Assignee: General Electric Company
[22] Filed: April 17, 1968
[21] Appl. No.: 721,992

[52] U.S. Cl. ..................60/261, 60/266, 60/39.65
[51] Int. Cl. .........................................F02k 3/10
[58] Field of Search............60/262, 264, 266, 39.65

[56] References Cited

UNITED STATES PATENTS

| | | |
|---|---|---|
| 2,672,728 | 3/1954 | Stockdale.....................60/39.65 |
| 2,794,319 | 6/1957 | Stockdale.......................60/262 |
| 2,851,854 | 9/1958 | Doll, Jr............................60/261 |
| 2,910,828 | 11/1959 | Meyer et al. ...................60/266 |
| 3,377,804 | 4/1968 | Wright et al....................60/262 |

Primary Examiner—Samuel Feinberg
Attorney—Derek P. Lawrence, Erwin F. Berrier, Jr., Lee H. Sachs, Frank L. Neuhauser, Oscar B. Waddell and Melvin M. Goldenberg

[57] ABSTRACT

A liner for a combustion zone, particularly the thrust augmentor of a jet engine which has longitudinally spaced circumferential corrugations and slot film cooling means at the radially inward portions of each corrugation. The corrugations minimize stress buildup due to circumferential thermal gradients and provide self-support while the slot cooling means allows such corrugations to be used without overheating of the liner. The cooling means may be formed of a corrugated circumferential strip between liner sections.

7 Claims, 4 Drawing Figures

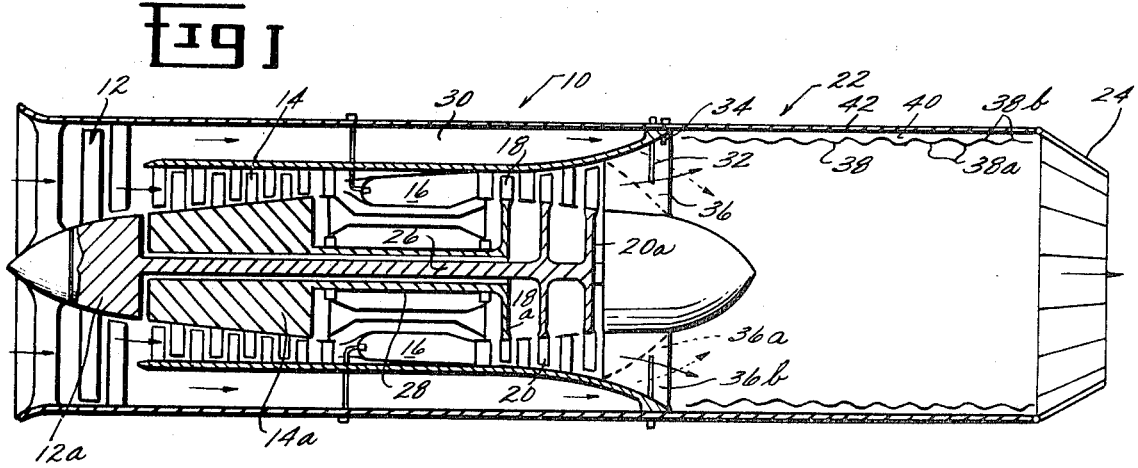
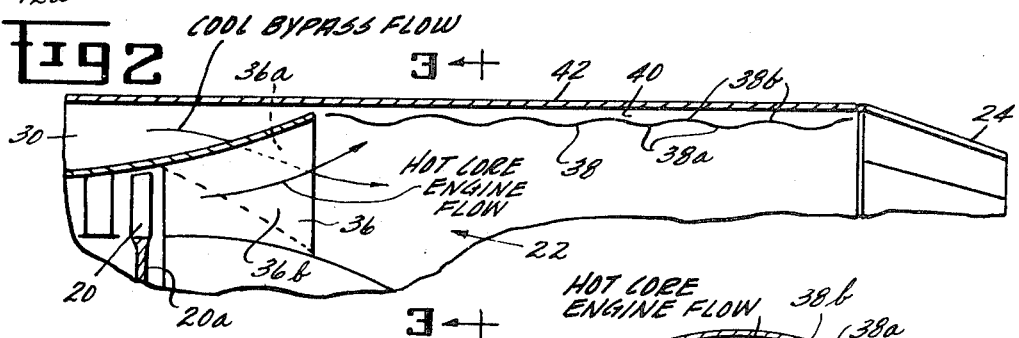
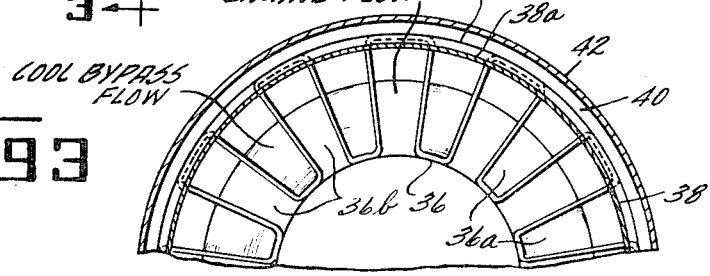
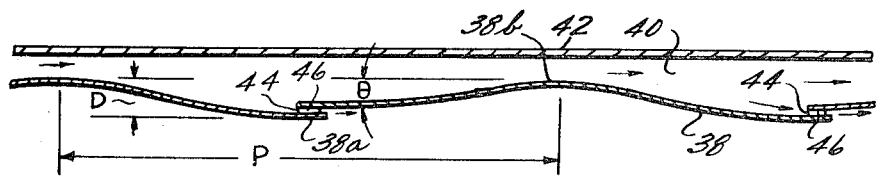
INVENTOR.
DUDLEY O. NASH
ATTORNEY

COOLED AUGMENTOR LINER

BACKGROUND OF THE INVENTION

The subject invention generally relates to liners for combustion regions of a jet engine and, in particular, means for providing structural strength and cooling of such a liner.

Generally, in thrust augmented turbofan or bypass engines, a mixer is located upstream of an augmentor duct having a cooling liner therein. The mixer allows hot turbine exhaust gases and cold bypass flow air to enter into the augmentor duct in a series of circumferentially arranged hot and cold gas flow sectors to provide mixing within a very short distance. These hot and cold gas flow sectors produce severe circumferential temperature gradients in the augmentor duct cooling liner which may cause severe buckling and distortions thereof. One solution to this problem which has been developed is the use of circumferential corrugations in the liner which tend to moderate the stresses built-up in the liner. It has also been found advantageous to have the corrugations quite deep so as to make the liner substantially self-supporting to minimize the amount of structural support needed for the liner. However, such deep corrugations result in local turbulent areas which may cause flame holding at each corrugation peak and resultant overheating at these places. Conventional, convection cooling of the liner does not materially alleviate this problem.

SUMMARY OF THE INVENTION

Accordingly, an object of the subject invention is to provide a combustion zone cooling liner which is able to minimize stress levels due to severe circumferential temperature gradients, is substantially self-supporting, and which prevents overheating of the liner while allowing efficient combustion therein.

The above mentioned object is satisfied, in accordance with the subject invention, by providing a circumferentially corrugated augmentor duct liner having film cooling slots located at the radially inward portion of each corrugation. This location of cooling slots provides a film of cooling air adjacent the interior of the liner so as to prevent flame holding and resulting overheating at the corrugation peaks. Also, due to this placement, the maximum tangent angle of each corrugation for a given corrugation ratio of pitch to depth is significantly less as each corrugation extends only from the outermost edge to a position at the outermost portion of the slot. A smaller corrugation tangent angle is useful because it lessens the tendency of the corrugations to produce turbulence and flame holding downstream of the corrugation peaks.

The subject matter which is regarded as the subject invention is particularly pointed out and distinctly claimed in the concluding portion of this specification.

BRIEF DESCRIPTION OF THE DRAWINGS

The subject invention, however, together with further objects and advantages thereof, may best be understood by reference to the following description taken in connection with the accompanying drawing in which:

FIG. 1 is a partially diagrammatic sectional side view of a turbofan engine of the type which embodies the subject invention;

FIG. 2. is a longitudinal section of the augmentor portion of the engine shown in FIG. 1;

FIG. 3 is a sectional view taken on line 3—3 of FIG. 2 showing the flow mixer; and FIG. 4 is a magnified sectional view of a portion of the augmentor duct with cooling liner.

DESCRIPTION OF THE PREFERRED EMBODIMENT

In FIG. 1, a side sectional partially diagrammatic view of an augmented turbofan engine 10 is shown. The engine basically consists of a fan 12, a high pressure compressor 14, a combustor 16, a high pressure turbine 18, a low pressure turbine 20, augmentor 22 and exhaust nozzle 24. The fan rotor 12a is driven by the low pressure turbine rotor 20a via an inner shaft 26. The high pressure compressor rotor 14a is driven by the high pressure turbine rotor 18a via an outer shaft 28.

In operation, air enters an intake of the engine and is compressed somewhat by the fan 12. This compressed air is then divided into two flow paths: one through an annular bypass duct 30 and the other to the intake of the high pressure compressor 14. The air flowing through the high pressure compressor 14 is further compressed and mixed with fuel in the combustor 16 wherein it is ignited and exhausted to flow first through the high pressure turbine 18 and then through the low pressure turbine 20 so as to drive the rotors thereof 18a, 20a. If the augmentor 22 is desired to be operated, fuel is added to the low pressure turbine exhaust gases via a plurality of spray bars 32, is ignited via an igniter 34, and is mixed via a mixer 36 with relatively cold air which has been ducted through the bypass passage 30. This mixing of the hot and cold flows improves the combustion efficiency. The resultant gaseous mixture then flows through an exhaust duct 42 and is then exhausted to the atmosphere through the exhaust nozzle 24, which is preferably of the variable-area type. The exhaust duct 42 is shielded from the hot augmentor gases by cooling liner 38 which is cooled by a portion of the bypass air which flows through a coolant passageway 40 between the liner 38 and an augmentor duct 42.

The subject invention particularly relates to the augmentor portion 22 of the engine 10, as shown in FIG. 2. The mixer 36, which operates as described above, is shaped and positioned to provide adequate mixture of the hot turbine exhaust air with the relatively cold air which is ducted through the bypass duct 30 from the fan 12. The mixer 36, generally, is of a serpentine cross-sectional shape, as shown in FIG. 3, so as to provide inlet sectors 36a, 36b alternately open to the inside and outside of the mixer. The outer sectors 36a communicate with the cold bypass air, and the inner sectors 36b communicate with the hot turbine exhaust gases so that the flow exiting from the mixer 36 has alternate regions of cold and hot gases to provide substantial mixing in a short axial distance.

The gases exhausting from the mixer 36 flow within the substantially cylindrical augmentor liner 38. As shown in FIG. 4, the outer surface of the liner 38 is convection cooled by the relatively cold engine bypass air flowing through the passageway 40 defined between the liner 38 and the augmentor duct 42. The liner 38 is corrugated to provide improved structural properties, as will be described below. Circumferentially located about each radially inward corrugation peak 38a of the liner 38 are a plurality of slots 44 which are positioned so that a portion of the cooling air flowing through the passageway 40 is directed through the slots 44 to provide a cool boundary layer along the interior surface of the liner 38 to prevent overheating thereof.

The slots 44 may be produced by the liner 38 from a plurality of annular sections having the desired corrugated shape and attaching a corrugated strip 46 between overlapping portions thereof. The strip 46 is a corrugated strip of metal having its corrugations alternately attached to the exterior and interior surfaces of adjacent liner sections. One such corrugated strip structure that may be used is more fully described in U.S. Pat. No. 3,307,354 - Macaulay et al. issued Mar. 7, 1967, assigned to the same assignee as the subject invention. Of course, any other structure known in the art may be used to provide such film cooling slots.

The shape of the liner 38 can best be described by means of three parameters: the pitch, P, which is the peak to corresponding peak axial distance; the depth, D, which is to the peak to opposed peak radial distance; and the angle $\theta$, measured between the maximum slope of the corrugations and the axial direction, as shown in FIG. 4.

A number of factors must be considered to determine the specific structural configuration of the liner corrugations. The first factor concerns the stress buildup in the liner due to the severe circumferential thermal gradient caused by the alternating cold and hot flow sectors exiting from the mixer 36. Due to these conditions, the liner adjacent the hot flow area tends to axially expand a great deal more than the portions of the liner adjacent the cold flow, thereby putting the liner in a state of alternate compressive and tensile stresses. As the liner is quite thin, due primarily to weight limitations, during thrust augmentation the liner may become elastically unstable and exhibit plastic buckling. Even if the liner were made thick enough to prevent buckling, the stress levels would probably be high enough to produce cracks in the liner due to cyclic stress fatigue. It has been found, however, that by corrugating the liner, buckling and fatigue failure are prevented. By experimentation, it has been found that pitch to depth ratios, P/D, of 30 or 40 to 1 are sufficient to accomplish this purpose. Of course, any smaller P/D ratio will also satisfy the above-mentioned structural requirement but will produce excessive friction losses and increase the required flow of cooling air.

A second factor in determining the structure of the liner is that it is advantageous to have the liner substantially self-supporting under the collapsing pressure exerted by the cooling so as to minimize the need for a large number of separate support means for the liner. The liner is necessarily subjected to a collapsing pressure since the cooling air outside the liner must be maintained at a higher pressure than that of the combustion gases to assure an adequate flow of coolant through the liner slots. In the past, non-corrugated liners have had to be supported in a large number of places both circumferentially and axially by means such as hangers. Although the deeper the corrugations, the more self-supporting the liner will be, tests have shown that the same P/D ratios that accommodate thermal expansion will also provide adequate structural strength for a buckling resistant, self-supporting liner.

The third factor, which is a consequence of the first and second factors, concerns the air flow in the passageway 40 between the liner 38 and the duct 42. It is desirable to have the air flowing through the passageway 40 at a substantially high velocity so as to obtain optimum convection cooling efficiency of the outer surface of the liner 38. This necessarily involves positioning the liner as close to the duct as possible. When the liner 38 is positioned close to the duct 42, the more pronounced the corrugations are, (i.e.. the greater the angle $\theta$) the more turbulence and hence fluid frictional losses are developed. Generally, the lower the pitch-to-depth ratio, P/D, the greater the loss in efficiency. Therefore, for this factor, preferably the P/D ratio should be as large as possible.

To have efficient combustion and agumentor performance, the augmentor fuel must be substantially uniformly distributed and burned within the liner. This makes it advantageous for the fuel to be burned as close to the liner as possible. However, the corrugations in a liner cause local turbulent areas about the interior surface of the liner which often produce flame holding near each radially inward corrugation peak, generally resulting in overheating of the liner. Conventional convection cooling of the liner interior has not been found to be sufficient to overcome this problem. However, the subject invention provides slot film cooling of the interior of the liner by providing cooling slots at the radially inward peaks of the corrugations which direct cooling air from the passageway 40 along the interior surface of the liner 38. This forms a small, relatively cool boundary layer along the interior surface of the liner 38 which allows the fuel to be burned substantially close to the liner 38 to promote efficiency while preventing overheating.

Another advantage of the slot cooled corrugated liner, in accordance with the subject invention, is that the maximum angle, $\theta$, of each corrugation is lessened by the use of slots located at the radially inward peak of each corrugation. This is because the liner need only extend from the outward corrugation peak to the outward surface of the slot rather than to the inward peak of the corrugation. Thus, the portion of each corrugation adjacent to and downstream of the slot will have a depth equivalent to the original peak-to-peak depth minus the height of the slot.

For example, for a depth of 0.120 inches the typical slot height may be 0.060 inches (this includes a 0.030 inch slot exit height plus a 0.030 thickness of the strip 46 used to define the slot). This configuration would decrease the depth by 50 percent which would double the P/D ratio and approximately halve the angle $\theta$. This provides a substantial advantage since the less the angle $\theta$, the less will be the amount of turbulence of the gas flow about the corrugations. It is desirable to avoid turbulent flow both on the outside surface of the liner within the coolant passageway 40 to prevent a velocity drop of the cooling fluid flowing thereabout and on the interior surface of the corrugations where turbulent flow may induce flame holding and hence overheating of the liner. In practice, a total slot height of greater than about 25 percent of the corrugation depth is adequate for effective cooling liner performance.

Another important feature of the subject invention is that while the slot film cooling allows use of a corrugated augmentor liner, with its significant structural advantages, no increase is required in the amount of cooling air necessary for cooling in the augmentor. The slot film cooling system as described above, when used with a liner having corrugations with a P/D ratio of approximately 10/1 - 40/1 needs no more air to cool the liner than would be used to cool a non-corrugated liner by any conventional method of cooling, such as convection or film cooling. Thus, there is no loss in overall engine efficiency.

The specific P/D ratio desired for any particular application depends on the relative importance to be given to each of the above-mentioned factors. In cases where supporting the afterburner liner is of relatively little problem, such as where a short or vectorable afterburner is used, greater emphasis may be placed on minimizing the fluid losses by the cooling air flowing through the passageway 40 between the liner and duct. In such cases the corrugations in the liner may be relatively shallow, preferably the P/D ratio being in the range of 40/1 - 20/1.

In other situations where the structural support of the afterburner liner is of considerable importance relative to fluid losses in the passageway 40, such as in very high thrust engines where large augmentor liners may be used, the corrugations in the liner may be somewhat deep, preferably the P/D ratio being in the range of 20/1 - 10/1.

The subject invention, which is particularly described above in connection with a thrust augmentor of a turbofan engine, can easily be adapted for use in a thrust augmentor or even combustor of any type of gas turbine engine. If the subject invention is to be applied to a combustor, it should be noted that the problem of plastic buckling associated with extreme circumferential temperature gradients would not usually be present. However, the cooling and self-support factors would be of considerable significance and would effect determination of the specific structural configuration within the scope of the subject invention.

Thus, the subject invention provides a liner for a combustion region, especially a thrust augmentor, of a gas turbine engine. The liner is light weight, will resist buckling stresses caused by severe circumferential temperature gradients, is substantially self-supporting and is sufficiently cooled on both its interior and exterior surfaces to eliminate failure due to overheating.

The scope of the subject invention is to be construed only with regard to the appended claims.

I claim:

1. In a liner for a combustion region of a gas turbine engine wherein included within the combustion region are an outer duct, a substantially cylindrical liner disposed within said duct and defining a coolant passageway between said duct and the exterior of said liner, means for providing a pressurized flow of cooling air to said coolant passageway, means for providing a flow of combustion supporting gas to the interior of said liner, the improvement comprising:
   a. said liner having a plurality of circumferential, substantially continuous corrugations therein, the interior surface of said corrugations defining the interior surface of said liner; and
   b. slot film cooling means included as part of said liner and located at the radially inward peak of each corrugation to direct cooling air flowing therethrough from said coolant passageway along the interior surface of said liner.

2. A liner as in claim 1 wherein the ratio of the pitch to the depth of said corrugations is in the range of 40/1 to 10/1.

3. A liner as in claim 2 wherein the combustion region is a thrust augmentor, said combustion supporting gas is hot turbine exhaust gas, and mixing means is provided at the upstream end of said liner to mix a portion of the cooling air with the hot turbine exhaust gas.

4. A liner as in claim 3 wherein said slot film cooling means is comprised of a corrugated strip circumferentially positioned between overlapping portions of the liner at the inward corrugation peaks thereof.

5. A liner as in claim 4 wherein the ratio of the pitch to the depth of said corrugations is in the range of 40/1 - 20/1.

6. A liner as in claim 4 wherein the ratio of the pitch to the depth of said corrugations is in the range of 20/1 - 10/1.

7. A liner as in claim 4 wherein the total height of the slots defined by said slot film cooling means is at least equal to 25 percent of the depth of said corrugations.

* * * * *